United States Patent [19]

Shinriki

[11] Patent Number: 4,515,819
[45] Date of Patent: * May 7, 1985

[54] PROCESS OF MAKING ENCRUSTED BAKERY PRODUCTS

[75] Inventor: Tatsuo Shinriki, Chiba, Japan

[73] Assignee: Height Inc., Chiba, Japan

[*] Notice: The portion of the term of this patent subsequent to May 1, 2001 has been disclaimed.

[21] Appl. No.: 542,194

[22] Filed: Oct. 14, 1983

Related U.S. Application Data

[60] Continuation-in-part of Ser. No. 357,314, Mar. 11, 1982, Pat. No. 4,446,160, which is a division of Ser. No. 224,833, Jan. 13, 1981, Pat. No. 4,334,464.

[30] Foreign Application Priority Data

Jan. 16, 1980 [JP] Japan .................................. 55-3197

[51] Int. Cl.$^3$ ................................................ A23P 1/00
[52] U.S. Cl. .................................... 426/297; 426/502; 426/94; 99/450.6; 99/450.1
[58] Field of Search ................... 426/275, 253, 92, 94, 426/513, 138, 297, 391, 502; 99/450.6, 450.1, 450.2, 450.4, 450.7

[56] References Cited

U.S. PATENT DOCUMENTS

| | | | |
|---|---|---|---|
| 2,386,993 | 10/1945 | Valdastri | 426/283 |
| 2,969,025 | 1/1961 | Schafer | 99/450.1 |
| 3,050,017 | 8/1962 | Mahler | 426/275 |
| 3,379,139 | 4/1968 | Lipinsky | 99/450.6 |
| 3,551,161 | 12/1970 | Whitestone | 426/283 |
| 3,669,007 | 6/1972 | Pulici | 99/450.6 |
| 3,853,218 | 12/1974 | Grasvoll | 206/497 |
| 3,858,497 | 1/1975 | Ishida | 99/450.6 |
| 3,912,433 | 10/1975 | Ma | 99/450.6 |
| 3,930,440 | 1/1976 | Ohkawa | 99/450.6 |
| 3,946,656 | 3/1976 | Hai | 99/450.6 |
| 4,014,254 | 3/1977 | Ohkawa | 99/450.6 |
| 4,047,478 | 9/1977 | Trostmann et al. | 99/450.1 |
| 4,084,493 | 4/1978 | Quintana | 99/450.6 |
| 4,094,236 | 6/1978 | Holmes et al. | 99/450.4 |
| 4,114,524 | 9/1978 | Welch | 99/450.4 |
| 4,160,634 | 7/1979 | Huang | 99/450.6 |

FOREIGN PATENT DOCUMENTS

| | | | |
|---|---|---|---|
| 513833 | 12/1970 | Fed. Rep. of Germany | 426/94 |
| 45-21620 | 7/1970 | Japan | 99/450.6 |
| 586375 | 3/1947 | United Kingdom | 426/94 |

Primary Examiner—Steven Weinstein
Attorney, Agent, or Firm—Wenderoth, Lind & Ponack

[57] ABSTRACT

A process for automatically forming an edible product, in particular a bun-like shaped encrusted roll. A ball of sticky edible paste material is deposited onto an edible thin film such as starch-film, or the film is deposited onto the ball, and the ball with the film is deposited onto a sheet of flattened glutanous dough or the dough sheet is deposited on the ball and film. A skirt portion of the dough sheet is then gathered together underneath the ball so as to be enclosed the ball with the dough.

7 Claims, 15 Drawing Figures

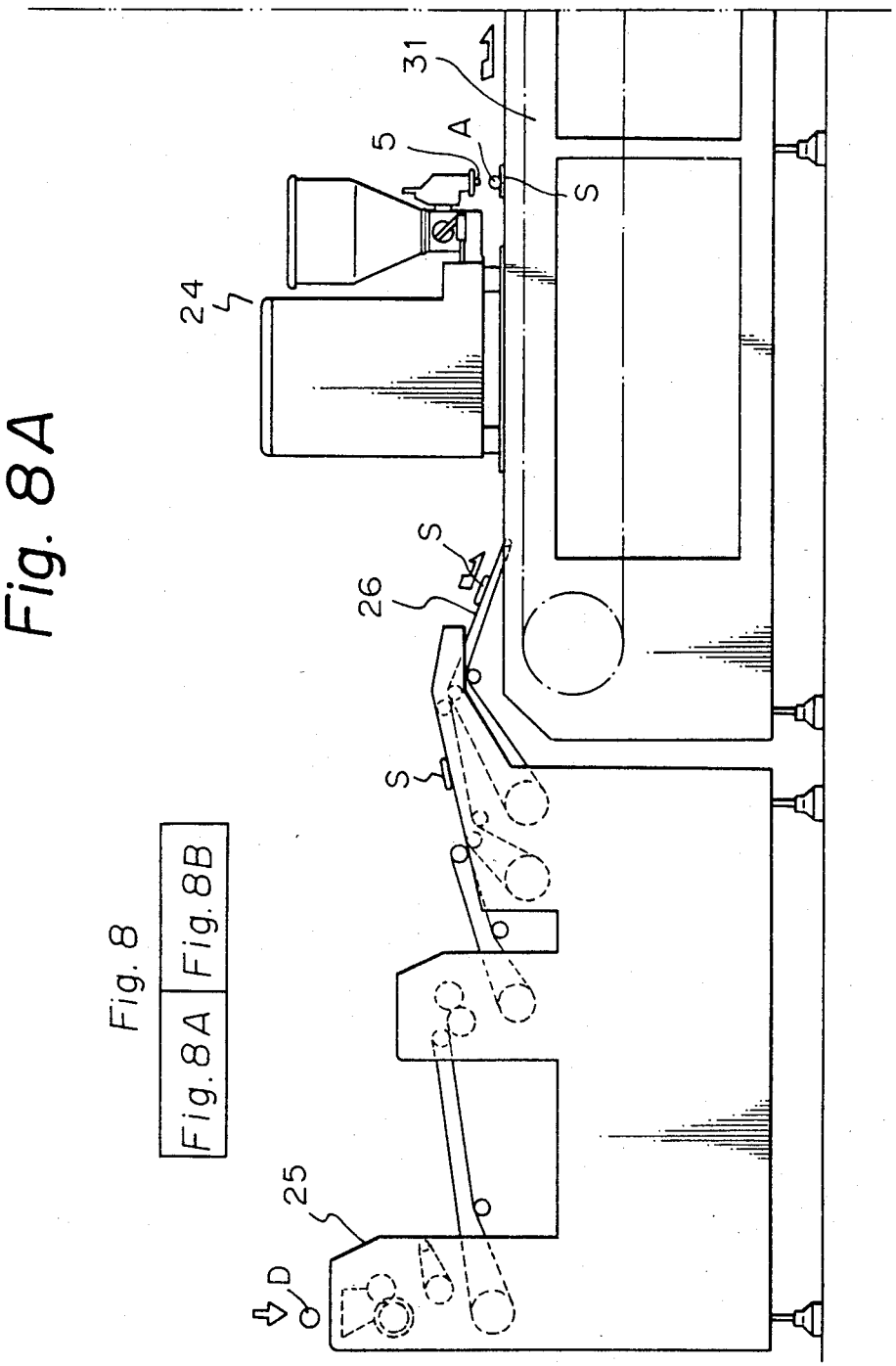

PROCESS OF MAKING ENCRUSTED BAKERY PRODUCTS

CROSS REFERENCE TO RELATED APPLICATIONS

This a continuation-in-part of application Ser. No. 357,314 filed Mar. 11, 1982, now U.S. Pat. No. 4,446,160 which is a division of Ser. No. 224,833 filed Jan. 13, 1981, now U.S. Pat. No. 4,334,464.

BACKGROUND OF THE INVENTION

1. Field of the Invention

This invention relates in general to an improved process of making encrusted bakery products.

2. Description of the Prior Art

Up to the present, the process of making encrusted bakery products or encrusted rolls which have a bun-like shape with yeast raised bread dough as crust, and with several kinds of pasty filling, such as sweet bean paste, jam, cream or custard cream, chocholate filling, minced meat paste, or cheese base paste, is almost always carried out by hand, especially when encrusting at the final stage of the process. More specifically, in this process, an individual round bread dough of certain weight (hereinafter called "crust dough") properly treated by dividing, rounding and intermediate proofing, which will build up its outer parts surrounding the pasty filling in the center of the roll, is flattened by hand or rolled out by one or two sets of rolling pins (hereinafter called "moulder"). On a round piece of flattened crust dough, a pasty ball of the filling is deposited by hand or depositing machine (hereinafter called "depositor"). The crust dough sheet with the filling on it, is then placed on the palm of the left or right hand, and the margin of the crust dough sheet is gathered centripetally by the fingers and pressed together by the fingers of the other hand, covering up the ball of filling inside the crust dough, and making up an encrusted roll.

Then, the made up round encrusted roll is put onto a pan upside down, with the gathered part which was pressed together by the fingers at the bottom, for the next steps of final proofing and baking.

As mentioned above, much of the process is performed by hand and thus in a mass production operation, many product make-up laborers must be employed. Furthermore, there is a problem in that products made by hand have a tendency to be unstable in quality and shape owing to the variation in skill among make-up laborers.

As an alternative to the above handwork, many attempts have been made to find an improved method, basically by some form of automation of the process, using machines of different principles.

The first approaches to development of a round roll encrusting machine were made along the lines of the conventional handwork process, using a divided and rounded dough ball, making it into a flattened piece of dough and moulding it into a bowl shape in a pot, depositing filling in the bottom part and gathering the projected margin of the flattened dough from the upper level of the edge of the pot. There are several devices for making such a bowl shaped piece of dough in a pot. In one case, a flattened piece of dough is placed over a hole with a piston at its top position flush with the upper surface of a cylinder and the piston is then drawn down, sucking down the piece of dough and forming it into a bowl shape in the pot. In another device for making a flattened piece of dough into a bowl shape, a piece of dough is placed over a pot with an open top, and a piston presses the dough down into the pot, or the nozzle of a filler depositor presses the dough down into the pot and then deposits the filling on the dough as the nozzle is lifted up. There are several devices for gathering the projected margin of the dough after it has been made into a bowl-like shape in the pot for encrusting. Some attempted to gather it by a camera iris-like closer, and others by several rods which gather the margin centripetally. In every case mentioned above, gathering the margin of the dough was not successful, because the margin cannot be fully projected outwards of the edge of the pot around its entire edge. One of the reasons for this is that the dough gained from a divided piece of dough is not always exactly round in shape; another reason is that the margin of the dough is not drawn to the center of the pot evenly around its entire circumference when being made into a bowl shaped piece by pressing or suction, even when starting with a perfectly round piece of dough, owing to the difference in friction between the margin and the upper surface of the pot (Reference: U.S. Pat. No. 3,858,497, "Apparatus for manufacturing wantans containing filler", by Masayuki Ishida).

Another attempt has been made by doubling two pieces of pre-flattened dough, between which is inserted the filling. In this case, the bottom piece of flattened dough is set on a conveyor belt and the filling is deposited thereon at is center, the top piece of dough is placed over the center of the piece of filling and also the bottom piece of dough. The margin of the top piece of dough closes the gap between the top and bottom pieces of dough by dough fermentation under certain conditions of humidity and temperature during final fermentation. Products made by this method have the problem that closure at the margin of the pieces of dough is not always perfect and leakage of filling often takes place. Additionally the bottom circumferential edge of such products tends to become rather thick and dense in texture, which is not acceptable to the consumers (Reference: U.S. Pat. No. 3,050,017, "Method of producing biscuits or similar baked products and apparatus for performing the same" by Willi Mahler; U.S. Pat. No. 4,114,525, "Filler capper machine" by Gray Gurner Welch; U.S. Pat. No. 4,094,236, "Ice cream sandwich forming apparatus" by Gordon W. Holmes and U.S. Pat. No. 3,946,656, "Manufacture of filled pastry rolls" by Harry Wong Hon Hai).

Another attempt has been made by using machines having a mechanism for extruding and encrusting. These attempts have, however, been unsuccessful. The reason for the lack of success in the case of fermented bread dough is that the gluten structure of the dough has a tendency to be destroyed when extruded from a nozzle with narrow clearance so that the resulting crumb texture of the products after baking become very weak in spite of the use of improved dough recipes and/or several changes in the method of extrusion. In particular, during the first one or two days after baking, the crumb texture rapidly becomes brittle and frail, as is often seen when the bread of roll becomes stale, and yet this period just coincides with the time period that the products are put on sale. Therefore, the crumb texture is a very critical quality of such products.

Another attempt has been made by doubling two large flattened pieces of dough, between which are placed blocks of filling which are deposited at a predetermined spacing. In this case, the bottom piece of dough which is rolled by many sets of rolls from bulk bread dough is transferred to a conveyor, balls of filling are deposited on this bottom piece of dough at a predetermined spacing, the top piece of dough which is similarly rolled from bulk bread dough is placed over the bottom piece of dough and the balls of filling, and then, by using a round cutter press, both pieces of dough are cut around the balls of filling, thus producing round encrusted products. However, this method also has not been successful. One of the reasons for this is that bread or rolls made from dough rolled from bulk dough are poor in crumb structure, have less volume and are pale in color, and are thus unacceptable to consumers. Another reason is that scrap dough remaining after cutting out cannot be mixed with new dough because it makes the dough quality poor if it is remixed, thus making inferior quality products (Reference: U.S. Pat. No. 2,386,933, "Method of and apparatus for making ravioli" by Marin Valdastri).

Another attempt has been disclosed (German Pat. No. 513833 Vorrichtung zum Herstellen von Würsten, by Otto Vetter) to mould and make encrusted food products, using one set of bowl shape moulds of the same size and hinged to each other, in one of which is placed a piece of dough with pasty filling placed thereon, and another piece of dough is placed over the filling, the mould being closed by the other bowl shape mould cover enclosing the dough pieces and filling therein, and then being clamped and baked.

This method has been well known from old times in Japan, but only for making pastry with filling encrusted inside, using a flour batter of high viscous liquid phase, and not for encrusted bread rolls made of filling and bread dough.

The reasons for this are:

(i) It is hardly possible to mould a piece of bread dough, which is not liquid but has a visco-elastic character, into an exact bowl shape shell.

(ii) Eating quality is spoiled by suppressing free fermentation expansion and also even raising of the dough with the bowl shape cover mould.

(iii) However, the margins of two pieces of flattened dough moulded in a bowl shape shell cannot be entirely sealed with each other unless the bowl shape cover mould suppresses expansion of the dough in the mould positively.

Another existing method for producing Chinese eggrolls, spring rolls, chaozu and pastries of certain kinds, consists of making flattened pieces of dough from a bulk dough block by rolling with several sets of rolls and cutting into square pieces of dough, depositing filling thereon, enclosing it by picking up and folding the four corners of the sheet, or partly folding and rolling wholly thereafter with the filling enclosed inside the dough, but this method cannot produce good quality products of desirable crumb texture and appetizing volume, when it is used for producing encrusted bread rolls using glutenous dough.

The reasons for this are:

(i) Rolling bulk dough continuously from bulk bread dough by several sets of rolls gives the dough character, especially the gluten structure of the dough, more undesirable tearing or strain than smaller scale rolling of dough pieces, and (ii) By these processes bun-like round shaped encrusted rolls cannot be produced, which is the main object of my invention. (References: U.S. Pat. No. 3,669,007, "Method and apparatus for rolling and tucking filled stuffs" by Louis Pullel; U.S. Pat. No. 3,379,139, "Method and apparatus for quantity production of unbaked pastries" by Robert J. Lipinsky; U.S. Pat. No. 4,047,478, "Apparatus for the production of rolled food products" by Erik Trostman; and U.S. Pat. No. 4,084,493, "Apparatus for producing food stuff" by Elias Pennis Quintans, et al; U.S. Pat. No. 3,912,433, "Automatic eggroll making machine" by Kwok Chuen Ma; U.S. Pat. No. 4,014,254, "Device for wrapping sheets around food in rolled form and other food processing device" by Nobuyoshi Ohkawa; U.S. Pat. No. 2,969,025, "Pastry folder" by Leonhard Schafer, and U.S. Pat. No. 4,160,634, "Automatic dumpling making machine" by Te-Hsin Huang).

SUMMARY OF THE INVENTION

The method of the invention relates to the performance of an automatic make-up machine in accordance with which plural sets of finger rods gather and seam the margin of a flattened piece of dough covering a ball of filling (edible pasty material) placed on a sheet of edible starch film in order to avoid problems resulting from the filling sticking to the conveyor belt.

It is a main object of the present invention to automatically make up a large amount of encrusted rolls which have a bun-like shape which are long-lived, and of good volume and uniform size due to the fact that no harm is caused to the bread dough.

It is another object of the present invention to reduce the required number of make-up laborers and to have a machine which is operable by a single operator.

BRIEF DESCRIPTION OF THE DRAWINGS

The structure, operation and effects of the present invention will become more apparent from the accompanying drawings in which:

FIGS. 8A and 8B are general views of a system of another embodiment for performance of the invention;

DESCRIPTION OF THE PREFERRED EMBODIMENT

Figure 1:
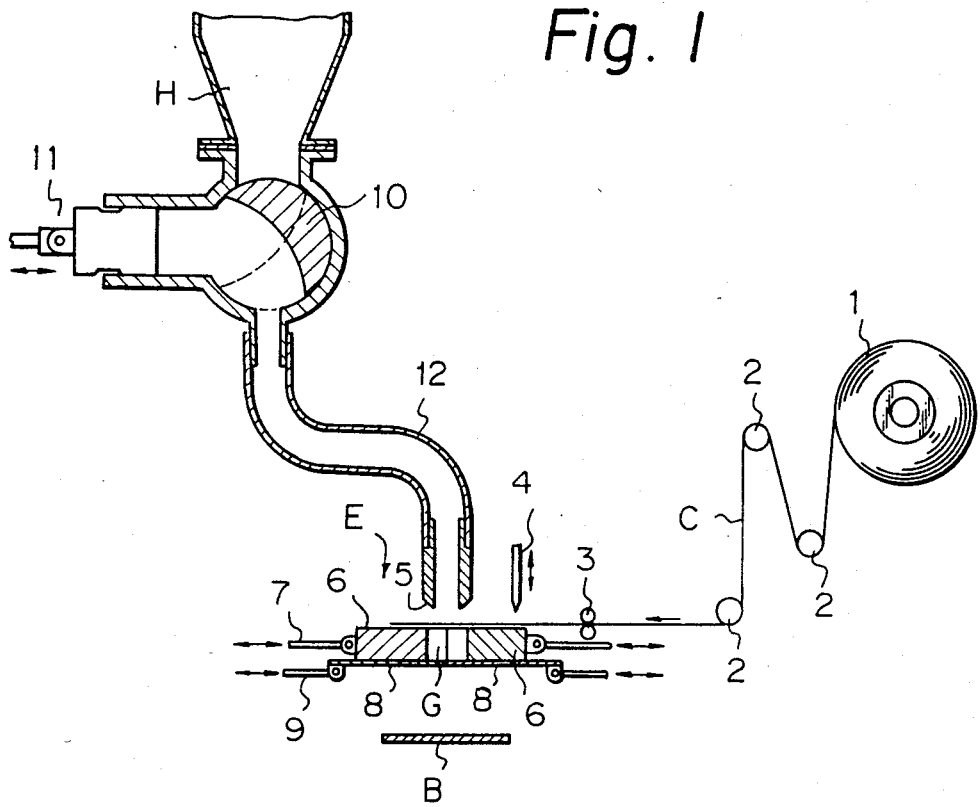
FIG. 1 is a partially cross-sectioned side vertical view of a principal part of a depositor which may be used in performance of the invention.

In FIG. 1, the filling stocked in the hopper H is drawn into a cavity of the valve 10 by movement of ram 11 in a leftward direction (in the drawing) when the valve 10 is at the position of the broken line, then the valve 10 is rotated to the position of the continuous line (in the drawing), and the ram 11 moves in a rightward direction. Thus, the filling is pushed out from the nozzle 5 through the hose 12 at regular intervals. A pasty filling ball A shown in FIG. 2 is deposited from the nozzle 5 on a sheet of starch-film C' which sticks to the lower portion (including the bottom surface and at least part of the side surface) of the pasty filling ball A to cover it.

The starch-film roll 1 unwinds and supplies its tape C to the beds 6 of the primary mechanism E suitable for covering the pasty filling ball A. The beds 6 have, for example, a round hole G in their closed position (in FIG. 1). As soon as the tape C is set on the beds 6 by the driving rollers 3 which drive tape C through the guide rollers 2, it is cut to a suitable length as a sheet of starch-film C' by the cutter 4.

The conveyor B travels in the rightward direction as viewed in FIG. 1.

Figure 2:
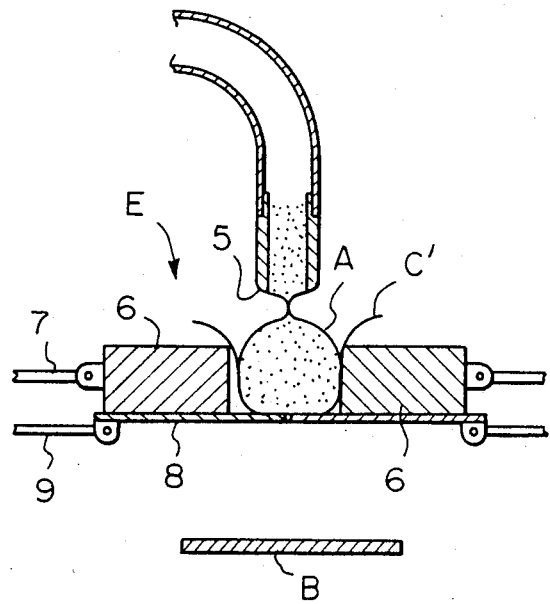
FIG. 2 is a partially cross-sectioned side vertical view of a nozzle part shown in FIG. 1.

When a pasty filling ball is put on a sheet of starch-film C' stretched across both beds 6, the starch-film sheet C' is pushed down by the weight of pasty filling ball A to flexibly conform the sheet C' to the shape of the bottom and side surfaces of the pasty filling ball A, and is tucked along the vertical side wall of the hole G and dropped onto the baffle plate 8 with the pasty filling ball A which is in the closed position shown in FIG. 2.

The beds 6 and baffle plate 8 are relatively opened and closed by the rods 7 and 9 in the direction indicated by the arrows as shown in FIG. 1.

Figure 3:
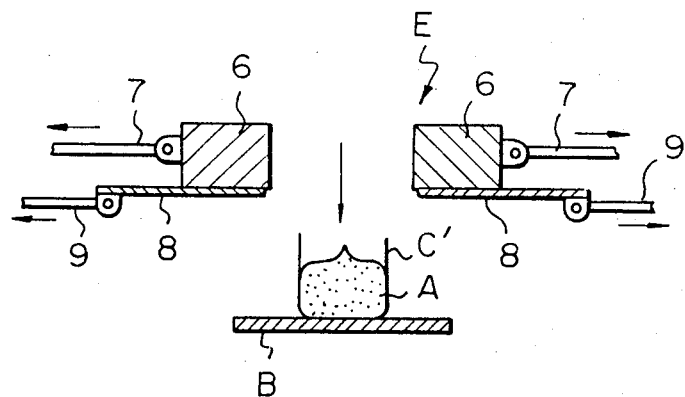
FIG. 3 is a partially cross-sectioned side view of the opening position of a filling ball holding mechanism which may be used in performance of the invention.

FIG. 3 is a view showing a pasty filling ball A primitively covered with a sheet of starch-film C' dropped by the opening stroke of the parts 6 and 8 onto the conveyor B. Thus, the composite of pasty filling ball A and sheet C' travels to the next station. In this way, a sheet of starch-film C' protects the conveyor surface B from direct contact with the bottom portion of the pasty filling ball A.

In consequence of the travel of the conveyor B, pasty filling A' formed from pasty filling ball A and starch-film sheet C' with which the pasty filling ball A is covered, is conveyed beneath a conveyor 12 which shifts dough sheet S over a filling A' such that a skirt portion of the dough sheet S drapes over the filling A' (shown in FIG. 4), the timing of the arrival of the filling A' on the conveyor B being synchronized with the arrival of the dough sheet S, so that the dough sheet drops on the filling A'.

Figure 4:
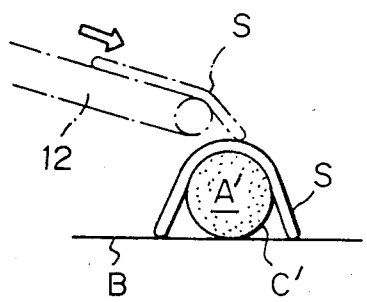
FIG. 4 is a side view of a pasty filling ball covered with a dough sheet S at the primary encrusting stage.
Figure 5A:
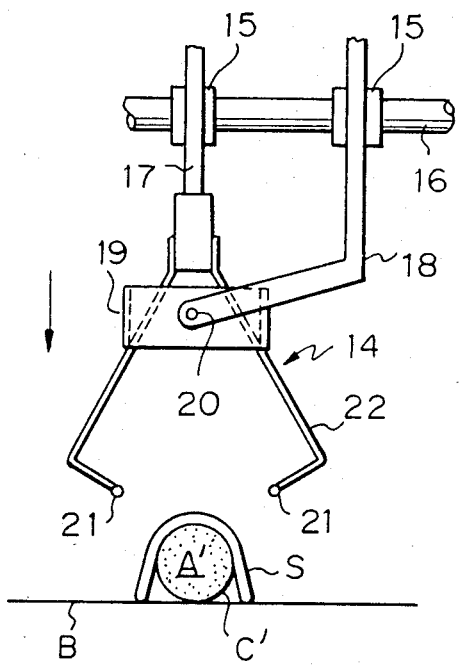
FIGS. 5a, 5b and 5c are side views of the mechanical sequence of the secondary stage of encrusting a pasty filling ball with a dough sheet in accordance with the invention.
Figure 5B:
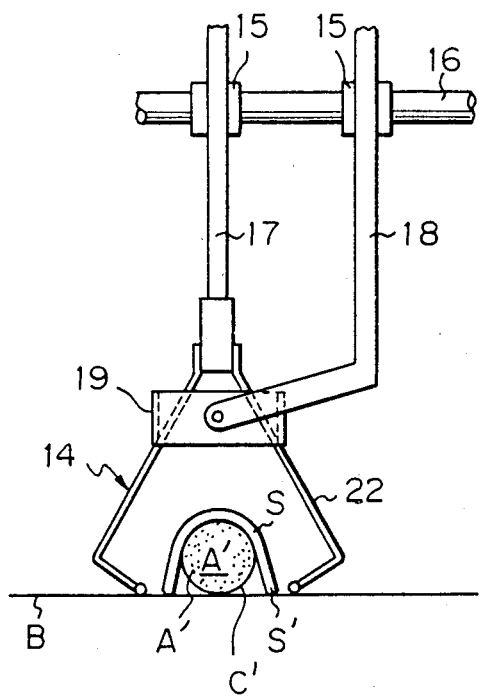
Figure 5C:
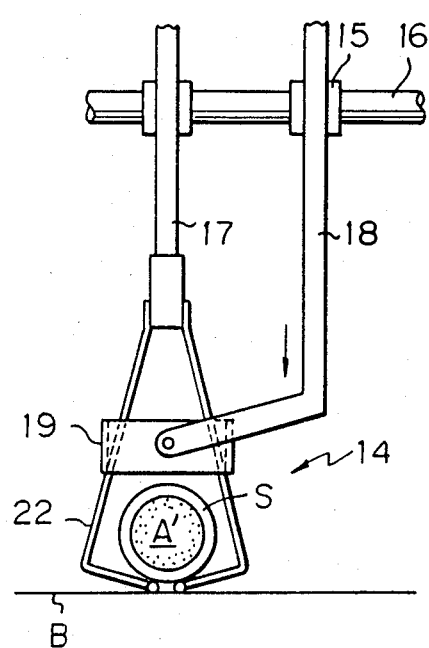

After the upper portion of the filling A' is covered with a dough sheet S as shown in FIG. 4, the composite is conveyed to the position of first finger rods encrusting mechanism 14. The sequence of operation of the finger rods encrusting mechanism 14 is shown in FIGS. 5a to 5c. After the composite is encrusted, the starch film sheet is completely enclosed, being sandwiched by the dough and the pasty filling so as to be merged and, in accordance with the known physical properties of starch-film, is melted therewith.

Figure 6A:
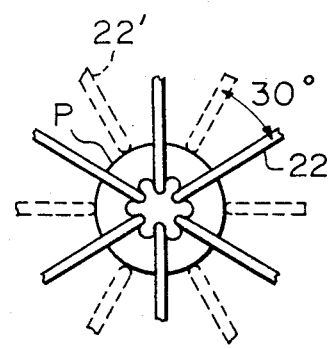
FIGS. 6a and 6b are cross-sectional views of the closing position of the finger rods which may be used at the secondary encrusting stage of the invention.
Figure 6B:
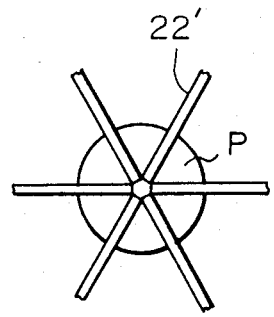

The finger rods encrusting mechanism 14 includes reciprocable rod 17 and elbow-type armrod 18 respectively built for vertical movement in the guide bearing 15 and 15' which are supported in the support 16 to a guide ring 19 connected to armrod 18 with pin 20 located directly under the rod 17 and plural finger rods 22 (for example six as illustrated in FIGS. 6a and 6b, only two being shown in FIGS. 5a–5c) which are elastically connected with the lower end of the rods 17 and can open and close freely in radical directions by the operation of the guide ring 19.

Each tip of the finger rods 22 has a Teflon globular part 21 which is suitable for handling rolled pieces of dough and a sticky filling (including the covering sheet of starch-film).

The finger rods make a closing motion when the rod 17 and armrod 18 go down to a fixed height and then the armrod 18 alone continues further down together with the guide ring 19 (as shown in FIG. 5c)

In this motion, the margin of skirt S' of the dough piece S draped over the filling A' is pushed centripetally and gathered by the finger rods 22 and globular parts 21. However, as shown in FIG. 6a, the skirt S' is not perfectly gathered after only one closing motion of the finger rods 22 and is shaped in the form of petals. Therefore, it is desirable that the other six finger rods 22, which are rotated 30° about their axis of symmetry relative to the first group of finger rods 22, are provided to perfectly regather and form a seam between the petal like parts of the dough. FIG. 6b shows the bottom of a piece of dough gathered and seamed perfectly. The seaming pressure does not adversely affect the baked products because the dough beneath the filling cannot expand in the final proofer and the oven due to the pressure of the weight of the filling.

In the closing motion of the finger rods 22, as the bottom surface of the filling A' encrusted with dough piece S is covered with a sheet of starch-film C' before dough sheet S is applied, the filling A', especially the part covered by starch-film sheet C' is primarily nonadhesive and very smooth and therefore conducive to being encrusted with the sheet S without irregular shape or distortion and without pasty filling becoming involved in the seam of dough, as shown in FIG. 6b. Further, if the skirt S' of the dough sheet is gathered and the starch-film sheet is sandwiched between the dough and the pasty filling, it is a property of starch-film that the starch-film will be eventually fused into the sticky pasty filling.

Furthermore, the dough sheet S, except its skirt S', does not undergo any pressure or tearing by the tips of the finger rods when being gathered so that the gluten structure of the dough also is maintained in ideal condition during the make-up process, thus resulting in better quality of the finished product.

Therefore, this invention makes it possible to automatically make up dough products having fine and sound gluten structure which hold moisture and gas cells in uniformity so that these products may be of good volume and kept fresh for a long period of time with a slower rate of becoming stale and a good flavor after baking.

Figure 7:
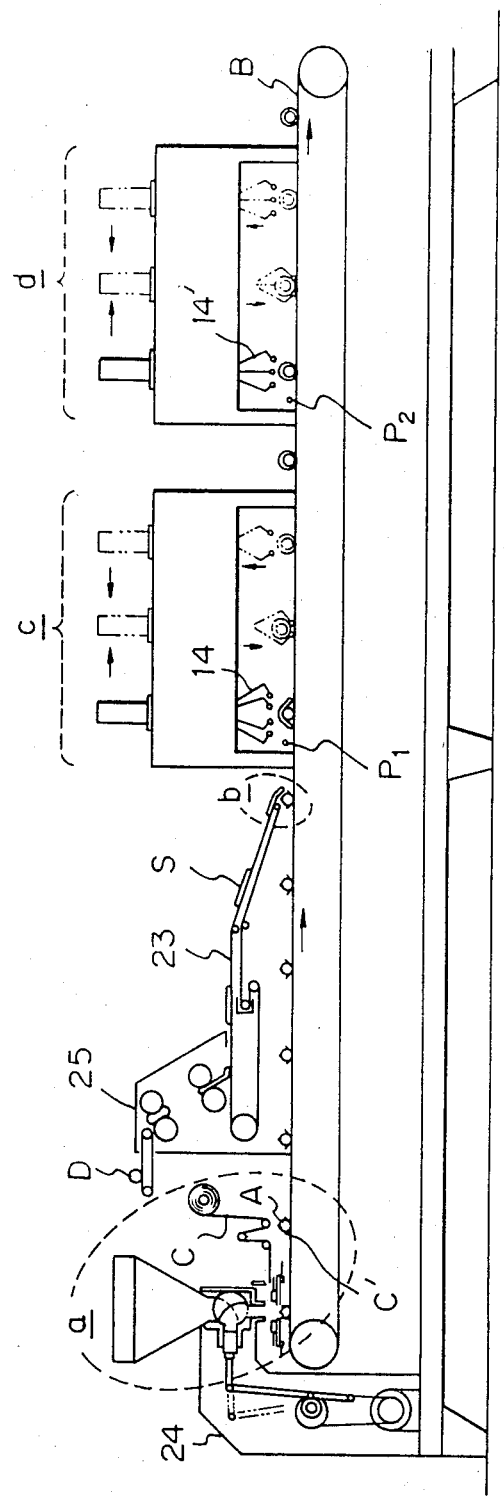
FIG. 7 is the general view of the system equipped with the devices shown in FIG. 1–FIG. 6.

I explain the whole performance of the system of the invention by reference to FIG. 7.

Reference symbol B designates a conveyor which performs encrusting by conveying filling with dough pieces thereon driven at a constant speed. Reference numeral 24 designates what is generally known as a depositor which deposits filling (with a cycle motion) intermittently, synchronized with a piece of dough being fed on to the filling thereafter.

Part a shows an apparatus for depositing filling and covering the filling with the sheet C' of starch film at its bottom, illustrated in FIGS. 1–3. Reference numeral 25 designates a moulder so called in any bread baking plant which rolls a dough ball into flat pieces by more than one pair of rolls. Part b is an apparatus for placing a dough sheet on a filling, shown in FIG. 4. Part c is an encrusting mechanism, containing encrusting device 14, which performs in the manner shown in FIGS. 5a–6a, sensing by photocell P1 the approach of a piece of dough with a filling or the composite of a ball and film A' thereunder, conveyed on the conveyor B, moving horizontally in synchronization with the speed of conveyor B, descending until its lowest position, encrusting the filling with the piece of dough, returning back to its initial position, and waiting for the next approach of a piece of dough with the filling A' to be encrusted. Reference symbol d designates also another encrusting mechanism of similar performance to mechanism C, but the gathering phase deflects about 30° as compared with the phase illustrated in solid lines in FIG. 6b.

A dough piece D is sent onto the feeding conveyor 23 of the moulder after dividing, shaping and intermediate proofing, to its correct position, where a pasty filling ball A, having been deposited by the depositor 24 on a sheet of starch-film C' cut simultaneously from a starch film tape C to form a composit filling A', and when beds 6 are open and baffle plate 8 opens, dropped onto the conveyor B, is finally covered and enclosed by the piece of dough sheet S checked at the enclosing location b at the end of the conveyor 23 illustrated in FIG. 7, finally to produce the shape illustrated in FIG. 4. A waiting conveyor drive intermittently may be necessary to ensure the synchronization of the filling A' and the dough sheet S, but here such device is not referred to in detail, because it is not the main purpose of this invention.

When the filling A' covered with a dough sheet S is conveyed by conveyor B and checked by photo-cell $P_1$, encrusting device 14 descends onto the conveyor and moving at the same speed and in the same direction as the conveyor B, it carries out the 1st encrusting operating with encrusting fingers, closing and opening, and then ascends and returns to its initial position. When the filling A' covered by the dough sheet S is further moved by the conveyor and checked by photo-cell $P_2$, the second encrusting mechanism descends onto the conveyor B, and moving at the same speed and in the same direction as the conveyor B, carries out the second encrusting operation in a similar manner and then ascends and returns to its original position.

Figure 8B:
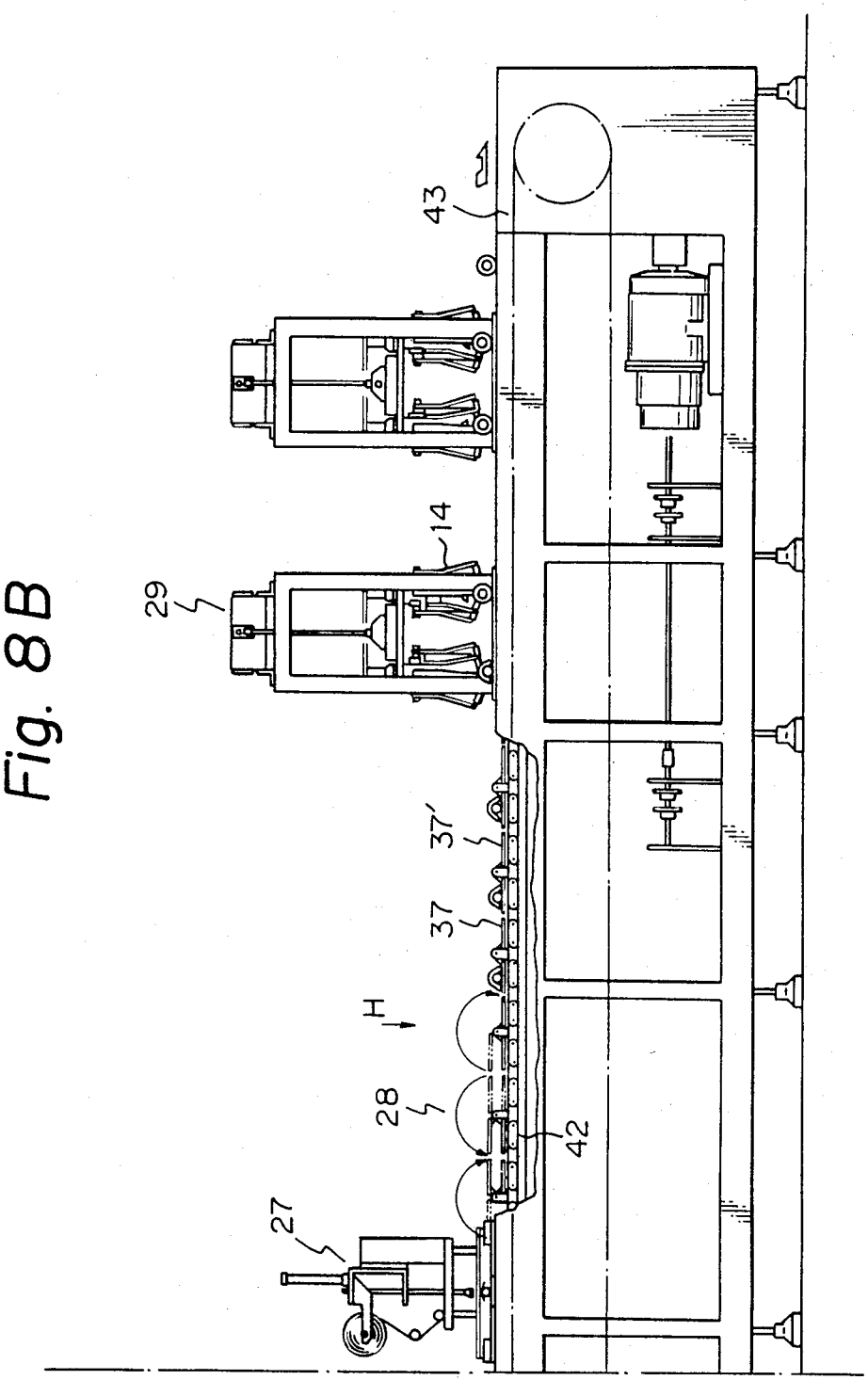
Figure 9:
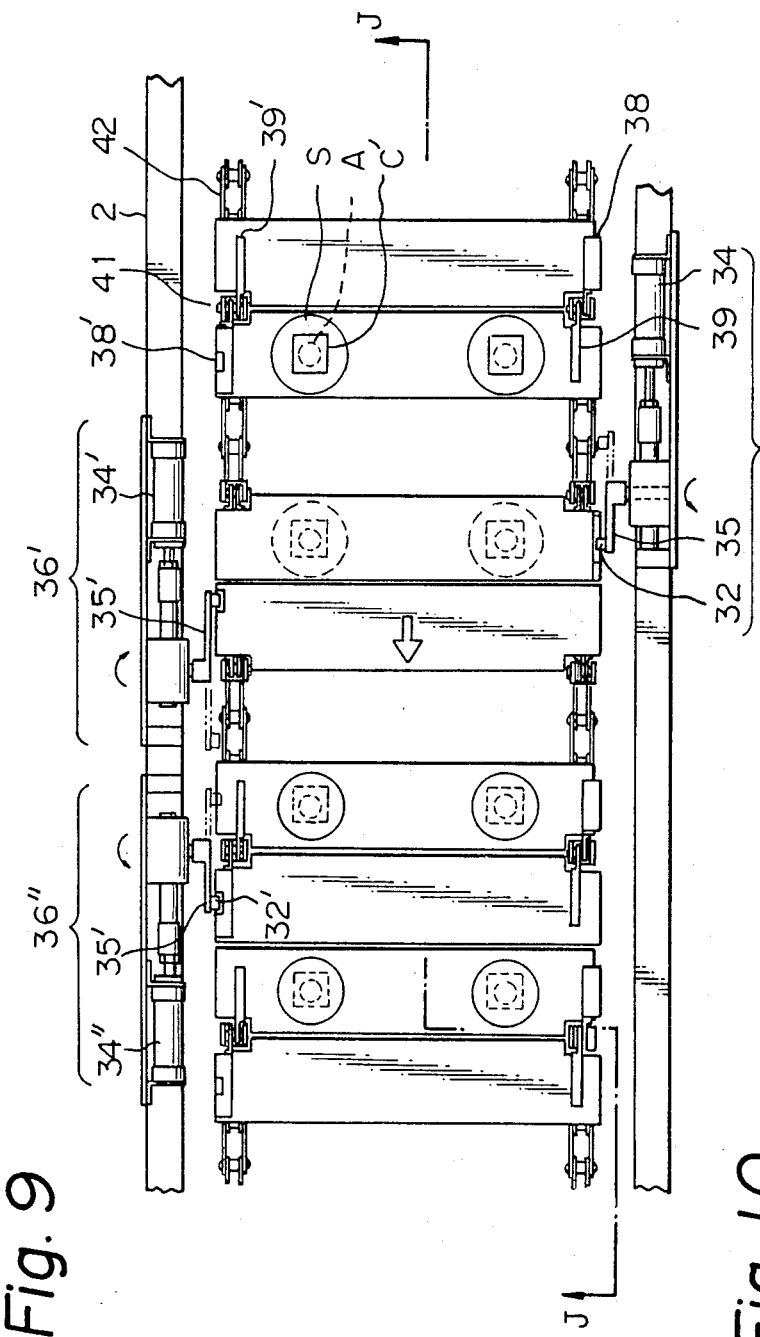
FIG. 9 is a plan view of a part of the system of FIG. 8 viewed in the direction indicated by the arrow H.
Figure 10:
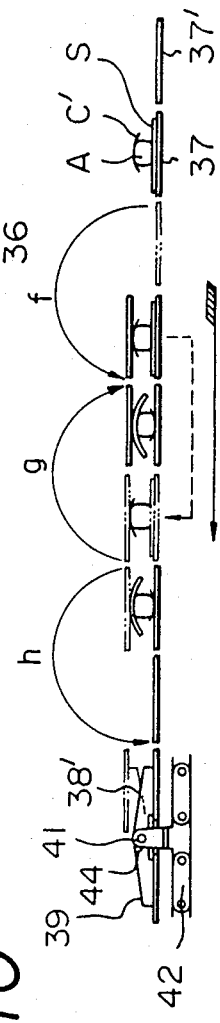
FIG. 10 is a cross-sectional view along the line J—J illustrated in FIG. 9.

Another embodiment of this invention is explained according to the machines shown in FIGS. 8, 9 and 10. Reference numeral 25 designates a moulder and reference numeral 43 designates a conveyor described hereinafter which is driven intermittently at a predetermined distance, with a plurality of plates (37 and 37') pivoted by hinges to a bracket attached to a conveyor chain 42. An intermittently driven conveyor 26 is provided at the delivery end of the conveyor of the molder for transferring the dough sheets rolled by the moulder to the appointed position on the plate of the conveyor 43. Reference numeral 31 designates the frame work of said conveyor 43. A filling depositor 24 is placed on the frame work 31. A nozzle 5 deposits pieces of filling intermittently. A feeding device 27 for sheets of starch-film C' is placed on the frame work 31, and rewinds the roll of starch-film, supplies the starch-film tape C and cuts it in the required shape for placing on a pasty filling ball A. Reference numeral 28 designates an upside-down device shown in FIGS. 9, 10. Reference numeral 29 designates a mechanism for lowering and raising the encrusting mechanism 14. Reference numeral 44 designates a bracket attached to the conveyor chain 42. Plates 37 and 37' are pivoted and hinged to said bracket 44. A pin 41 of a hinge is fixed to the bracket 44. Arms 38 and 38' with grooves for turning the plates 37 and 37' are fixed to the plates, hinged with the pin 41 and turn around the pin 41.

Arms 39 and 39' for turning the plates 37 and 37' are also fixed to the plates 37 and 37', hinged with the pin 41, and turn around the pin 41.

Reference numeral plate 36 designates a plate turning device for turning the plate 37' onto the plate 37 (shown at f in FIG. 10). Reference numeral 36' designates plate turning device for turning the plates 37 and 37' through 180° together and facing each other (shown in g at FIG. 10). Reference numeral 36 designates a turning device for returning the plate 37 to its initial position (shown at h in FIG. 10). The rollers 32, 32' and 32" are provided at the end of the turning arms 35, 35' and 35" in the turning devices 36 and 36', 36" respectively, which turns through 180 degrees plates 37 and 37' are arms 38 38' by revolving 180 degrees by means of going and returning by the upward and downward stroke motion of an air cylinder connected by rack and pinion gears (not shown). An explanation of the operation is as follows:

A dough piece D sent to the moulder 25 is flattened by rolls and transferred onto the appointed or predetermined position of plate 37 by means of the intermittently movable conveyor 26. The conveyor with plate 37 carrying the dough sheet S thereon advances by several intermittent motions, and when it arrives at a position just under the nozzle 5 of the filling depositor 24, the depositor is activated to deposit a ball of pasty filling onto the flat dough sheet S. Existence of a dough sheet on the plate 37 is checked by a sensor of generally known type, and in a case where no dough sheet arrives at the filling depositing position, no depositing takes place as a matter of certainty. As shown in FIGS. 9 and 10, the conveyor with plate 37 carrying the dough sheet S with a ball of pasty filling A thereon advances further and arrives at the position just under the starch film feeding device 27; the starch-film tape C is then fed from a starch film roll and cut to required length, and is placed over the pasty filling ball A on the dough sheet S. Thus, the starch-film is stuck to the pasty filling ball A, covering at least its upper portion. The filling A' being sandwiched by the starch-film sheet C' and the dough sheet is sufficient to prevent the pasty filling from sticking undesirably to other surfaces. The situation existing at the end of above-mentioned process is shown in the drawing in FIGS. 9 and 10. The plates 37, 37' advance intermittently, passing through the following processes f, g, h shown in FIG. 10, and finally reaching the stage at the position right under the encrusting mechanism 14 where the starch-film C' lies at the bottom, a pasty filling ball A placed thereon, and a dough sheet S covering them as in the aforementioned embodiment. The system has four encrusting mechanisms 14 in the direction of conveying of the plates 37 and 37', and they descend by the vertical reciprocator 29 while the plates pose and the fingers 22 of the encrusting mechanism 14 open and close for encrusting, and then ascend to their initial position. By means of these four encrusting heads, each combination of the starch-film C', the pasty filling ball A, and the dough sheet S passes 4 times through the encrusting process before encrusting is finished. The gathering motion of the fingers of each encrusting mechanism 14 is alternated 30° one after another as shown in FIGS. 6a and 6b.

This embodiment is made on the principle that a device for covering the filling A' with the starch-film C', in such a manner as to help retain the shape of the deposited filling as shown in FIGS. 1, 2 and 3, is not needed for the filling which consists of a rather hard paste and which can retain its own shape. In such a case it is sufficient to cover the under surface of the filling A' with the starch-film C' for the prevention of unwanted sticking to other surfaces.

Figure 11:
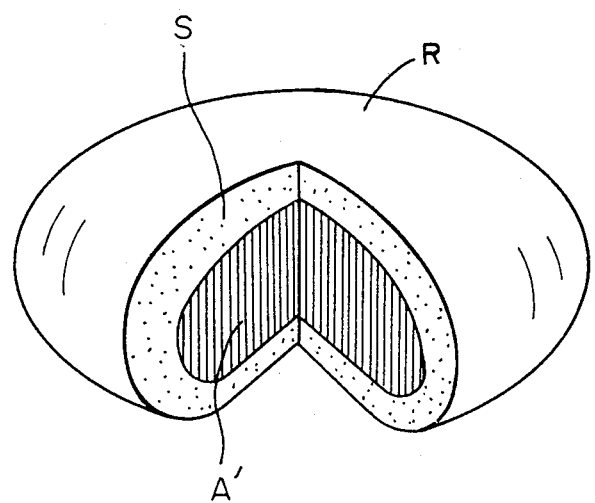
FIG. 11 is a perspective view of the encrusted bakery product made by this invention, with part cut away.

In FIG. 11, reference symbol A' designates the encrusted filling and reference symbol R designates the product which has had a final proofing and has been baked. The products with a thick upper layer of crumbs and a thin bottom layer of crumbs is regarded as of good quality and good volume and is better liked by consumers. The starch film is dissolved by water, so that it can not be seen.

The said starch film is edible cellophane like film made from potato starch or rice starch or corn starch and the like. It is tasteless, transparent and flexible. Being made from starch, it is nutritious, and easily dissolves in water, but not in alcohol, fat or oil. It is mainly used to wrap candy or jelly candy. If the starch film is eaten with candy, it does not affect the candy's flavour and taste, melting in the mouth. Another use is to wrap bitter powdered medicine to make it easy to drink with water.

While the invention has been shown in typical forms only, it should be apparent to those skilled in the art that it is not so limited but may be easily subjected to various changes and modifications without departing from the spirit thereof.

What is claimed is:

1. A process of covering a ball of sticky edible paste material to form an edible product, comprising the steps of:
   (1) depositing a ball of edible pasty filling onto a film of thin, flexible edible material such that the film sticks to and covers the lower portion of the ball so as to prevent the ball from undesirably sticking to other surfaces during said process;
   (2) merging the composite of the ball and the film with a sheet of flattened glutenous dough by depositing the sheet of dough on the ball and film so as to cover the ball, such that the sheet of dough includes a skirt portion draped over the ball and film; and
   (3) gathering the skirt portion of the dough sheet underneath the ball and film such that the margins of the skirt portion are brought together and the ball and film are enclosed.

2. A process as in claim 1, wherein said step of depositing includes the step of depositing the ball onto the film such that the film sticks to and covers the bottom surface and at least part of the side surface of the ball so as to help retain the shape of the ball.

3. A process as in claim 1, wherein said step of depositing includes the step of depositing the ball onto the film such that the film sticks to and covers the bottom portion, including at least a part of the side surface, of the ball.

4. A process as in claim 1, wherein said step of depositing includes the step of depositing the ball onto the film such that the film sticks to and covers the bottom surface and the side surface of the ball so as to help retain the shape of the ball.

5. A process of covering a ball of sticky edible paste material to form an edible product, comprising the steps of:
   (1) depositing a ball of edible pasty filling onto a sheet of flattened glutenous dough;
   (2) depositing a film of thin, flexible edible material onto the ball to as to stick to and cover at least the upper portion of the ball to prevent the ball from sticking undesirably to other surfaces during said process;
   (3) inverting and depositing onto a conveyor belt, the composite of the ball of pasty filling, the sheet of dough, and the film, such that the film is on the conveyor belt, the ball is on the film, and the sheet of dough covers the ball and film such that the sheet of dough includes a skirt portion draped over the ball and film; and
   (4) gathering the skirt portion of the sheet of dough underneath the ball and film such that the margins of the skirt are brought together and the ball and film are enclosed.

6. A process as in claim 5, wherein said step of depositing includes the step of depositing the film on the ball such that the film covers and sticks to the top surface and at least a portion of the side surface of the ball.

7. A process as in claim 5, wherein said step of depositing includes the step of depositing the film on the ball such that the film covers and sticks to the top surface and the side surface of the ball.

* * * * *